United States Patent
Mannava et al.

(10) Patent No.: US 6,551,064 B1
(45) Date of Patent: Apr. 22, 2003

(54) LASER SHOCK PEENED GAS TURBINE ENGINE INTERMETALLIC PARTS

(75) Inventors: Seetharamaiah Mannava, Cincinnati, OH (US); William D. Cowie, Xenia, OH (US)

(73) Assignee: General Electric Company, Schenectady, NY (US)

( * ) Notice: Subject to any disclaimer, the term of this patent is extended or adjusted under 35 U.S.C. 154(b) by 558 days.

(21) Appl. No.: 08/686,630

(22) Filed: Jul. 24, 1996

(51) Int. Cl.$^7$ .................................................. B63H 1/26
(52) U.S. Cl. ............................ 416/223 A; 416/241 R; 416/241 B; 29/889.7
(58) Field of Search ....................... 416/223 A, 241 R, 416/241 B; 219/121.65, 121.69, 121.85; 29/889.1, 889.7

(56) References Cited

U.S. PATENT DOCUMENTS

| | | |
|---|---|---|
| 3,566,662 A | 3/1971 | Champoux |
| 3,576,070 A | 4/1971 | Parsons |
| 3,689,176 A | 9/1972 | Howell et al. |
| 3,834,833 A | 9/1974 | Faber et al. |
| 3,850,698 A | 11/1974 | Mallozzi et al. |
| 4,002,403 A | 1/1977 | Mallozzi et al. |
| 4,060,769 A | 11/1977 | Mallozzi et al. |
| 4,401,477 A | 8/1983 | Clauer et al. |
| 4,426,867 A | 1/1984 | Neal et al. |
| 4,539,461 A | 9/1985 | Benedict et al. |
| 4,557,033 A | 12/1985 | Champoux |
| 4,708,752 A | 11/1987 | Kar |
| 4,844,694 A | 7/1989 | Naudet |
| 4,934,170 A | 6/1990 | Easterbrook et al. |
| 4,937,421 A | 6/1990 | Ortiz, Jr. et al. ........ 219/121.68 |
| 4,972,061 A | 11/1990 | Duley et al. |
| 5,120,197 A | 6/1992 | Brooks et al. |
| 5,127,019 A | 6/1992 | Epstein et al. |
| 5,131,957 A | 7/1992 | Epstein et al. |
| 5,226,785 A | 7/1993 | Narayana et al. |
| 5,235,838 A | 8/1993 | Berstein |
| 5,299,353 A * | 4/1994 | Nazmy et al. ....... 416/241 R X |
| 5,306,360 A | 4/1994 | Bharti et al. |
| 5,307,622 A | 5/1994 | Ciokajlo et al. |
| 5,316,720 A | 5/1994 | Spiegel et al. |
| 5,393,356 A | 2/1995 | Singheiser ................... 148/421 |
| 5,395,699 A | 3/1995 | Ernst et al. |
| 5,415,831 A * | 5/1995 | Baumann et al. .............. 419/38 |
| 5,492,447 A | 2/1996 | Mannava et al. |
| 5,531,570 A * | 7/1996 | Mannava et al. ... 219/121.65 X |
| 5,591,009 A * | 1/1997 | Mannava et al. ... 219/121.68 X |
| 5,744,781 A * | 4/1998 | Yeaton ................... 219/121.84 |
| 5,756,965 A * | 5/1998 | Mannava ................ 219/121.85 |

FOREIGN PATENT DOCUMENTS

| | | |
|---|---|---|
| JP | 52-5187 | 1/1977 |
| JP | 59-70811 | 4/1984 |

OTHER PUBLICATIONS

"Laser shocking extends fatigue life", American Machinist, A Person Publication, Jul., 1992, pp. 62–64.

"Laser Shock Processing Increases the Fatigue Life of Metal Parts", Materials and Processing Report, Sep., 1991, pp. 3–5.

"Stress Peening or Strain Peening", Metal Improvement Company, Inc., pp. Contents, 40, 41, 75.

"Ordered Intermetallics", Metals Handbook, Library of Congress Cataloging–in–Publication Data, ASM International, Oct., 1990, pp. 927 and 929.

* cited by examiner

Primary Examiner—Edward K. Look
(74) Attorney, Agent, or Firm—V. G. Ramaswamy; Steven J. Rosen

(57) ABSTRACT

An intermetallic article such as a gas turbine engine component and method of manufacture thereof includes a region having compressive residual stresses imparted by laser shock peening (LSP) extending into the article from a laser shock peened surface. One embodiment includes a turbine or compressor blade with an intermetallic airfoil having a leading edge and at least one laser shock peened surface extending radially along at least a portion of the leading edge with a region having compressive residual stresses imparted by laser shock peening (LSP) extending into the intermetallic airfoil from the laser shock peened surface.

14 Claims, 6 Drawing Sheets

LASER SHOCK PEENED GAS TURBINE ENGINE INTERMETALLIC PARTS

RELATED PATENT APPLICATIONS

The present Application deals with related subject matter in co-pending U.S. patent Ser. No. 08/319,346, entitled "LASER SHOCK PEENED ROTOR COMPONENTS FOR TURBOMACHINERY"; Ser. No. 08/373,133, entitled "LASER SHOCK PEENED GAS TURBINE ENGINE FAN BLADE EDGES", filed Jan. 10, 1995; Ser. No. 08/362,362, entitled "ON THE FLY LASER SHOCK PEENING", filed Dec. 22, 1994; Ser. No. 08/399,285, LASER SHOCK PEENED GAS TURBINE ENGINE COMPRESSOR BLADE EDGES", Ser. No. 08/362,362, entitled "ON THE FLY LASER SHOCK PEENING"; Ser. No. 08/638,623, entitled "ADHESIVE TAPE COVERED LASER SHOCK PEENING"; and in U.S. patent Ser. No. 08/638,622, entitled "DRY TAPE COVERED LASER SHOCK PEENING", all of which are assigned to the present Assignee and have at least one inventor in common with the present application.

BACKGROUND OF THE INVENTION

1. Field of the Invention

This invention relates to laser shock peened intermetallic articles of manufacture and methods to laser shock peened intermetallic articles and, more particularly, to gas turbine engine parts such as intermetallic airfoil leading edges having localized compressive residual stresses imparted by laser shock peening.

2. Description of Related Art

Gas turbine engines and other machinery and engines operate parts in high temperature conditions that often require heat resistant metallic parts. Cobalt and nickel-base superalloy materials have been developed to provide mechanical strength at high temperatures so that the operating temperature capability of compressor and turbine blades was increased over the operating temperatures of prior designs but they are heavy. In an effort to reduce the weight of gas turbine engines intermetallic materials have been developed, particularly, for use as compressor and turbine blades. Low pressure turbine blades fabricated from gamma titanium aluminide have successfully been tested and use of such blades could eventually result in reducing the weight of aviation gas turbines by hundreds of pounds. Such blades typically have about half the weight of comparable components made from conventional nickel-based metallic alloys. The tested intermetallic material had 49% titanium, 47% aluminum, 2% chromium, and 2% niobium and when compared with conventional nickel-based alloys, the intermetallic material has half the density and is comparable in strength out to about 1400 degrees Fahrenheit. The titanium aluminide also is about 50% stiffer than conventional titanium alloy blades. It has been estimated that if an intermetallic material was used in the low pressure section of the GE90 as a blade material, the titanium aluminide could cut engine weight by more than 300 pounds. Lighter blades would also allow turbine wheels to be lighter and less robust because the reduced weight blades create lower stresses during operation.

Intermetallic materials vary widely in composition but are generally defined to include materials between metal and ceramic, as described in U.S. Pat. No. 5,299,353 "TURBINE BLADE AND PROCESS FOR PRODUCING THIS TURBINE BLADE". Gamma-titanium aluminides used for turbine and compressor blades have properties which are beneficial to their use as a material for turbine blades exposed to high temperatures. These include, among other things, their density, which is low in comparison with superalloys conventionally used, for example where Ni-superalloys are concerned the density is more than twice as high. The material of the turbine blade disclosed in U.S. Pat. No. 5,299,353 has a comparatively high heat resistance, but the ductility of this material at room temperature is comparatively low and, therefore, damage to parts of the turbine blade subjected to bending stress cannot be prevented with certainty.

One major drawback with blades made from intermetallic materials is their much lower ductility and brittleness. It is well known that titanium aluminides and other intermetallic materials are highly difficult to work with because their ductility is only a few percent at room temperature. Blades must be hardened and toughened to prevent failing of substantial portions of the blade due to foreign object damage (FOD). The resultant fatigue failure that may occur is due to the formation and propagation of a crack. Conventional shot peening of metallic articles to impart compressive residual stresses to relatively low depths is well known in the art and has even been suggested for use on thin blade edges in U.S. Pat. No. 4,426,867. However, shot peening has never been even suggested for use on articles made of intermetallic materials because of their well known low ductility and brittleness properties.

The region of compressive residual stresses imparted by laser shock peening of the present invention is not to be confused with a surface layer zone of a metallic work piece that contains locally bounded compressive residual stresses that are induced by a hardening operation using a laser beam to locally heat and, thereby, harden the work piece such as that which is disclosed in U.S. Pat. No. 5,235,838, entitled "Method and Apparatus for Truing or Straightening Out of True Work Pieces". The present invention uses multiple radiation pulses from high power pulsed lasers to produce shock waves on the surface of a work piece made of intermetallic material similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties" for metallic materials. Laser peening as understood in the art and as used herein means utilizing a laser beam from a laser beam source to produce a strong localized compressive force on a portion of a surface. Laser peening has been utilized to create a compressively stressed protection layer at the outer surface of the metallic workpiece which is known to considerably increase the resistance of the workpiece to fatigue failure as disclosed in U.S. Pat. No. 4,937,421, entitled "Laser Peening System and Method". However, the prior art does not disclose or even suggest laser shock peening of intermetallic materials such as compressor and turbine blade leading and trailing edges of the type claimed by the present patent nor the methods how to produce them. It is to this end that the present invention is directed. The invention is not limited to compressor and turbine blades but is applicable to other parts of the gas turbine engine and other articles of manufacture that use intermetallic materials.

SUMMARY OF THE INVENTION

An intermetallic article having an intermetallic body with at least one laser shock peened surface on at least a portion of the intermetallic body and a region having compressive residual stresses imparted by laser shock peening extending into the intermetallic body from the laser shock peened surface. A particular embodiment of the intermettalic article is a gas turbine engine component such as a compresor or turbine blade and wherein the body is an intermetallic airfoil having a leading edge and a trailing edge and a pressure side and a suction side, and at least one laser shock peened surface on at least one side of the airfoil. The laser shock peened surface extends radially along at least a portion of the leading edge and chordwise from the leading edge, and the region having compressive residual stresses imparted by laser shock peening extends into the airfoil from the laser shock peened surface. Preferably both sides of the airfoil are laser shock peened along the leading edge. The trailing edge may also be provided with similar laser shock peened regions having compressive residual stresses imparted by laser shock peening extending into the airfoil from laser shock peened surfaces.

The present invention also includes a method for laser shock peening an intermetallic article as described above and which includes forming a coated surface by covering a laser shock peened surface on at least a portion of the intermetallic body of the intermetallic article with an ablative medium, providing a confining medium over the coated surface, and firing a laser beam on the coated surface with sufficient power to vaporize the ablative medium to form a region in the intermetallic body having compressive residual stresses imparted by the laser beam pulsing such that the region extends into the intermetallic body from the laser shock peened surface. The step of providing a confining medium over the coated surface may be flowing a clear fluid curtain such as water over the coated surface. Forming a coated surface may be accomplished by coating the laser shock peened surface with an ablative paint or adhesively covering the laser shock peened surface with a tape having an ablative medium.

The laser beam, which repeatably pulses between relatively constant periods, may be continuously fired on the coated surface of the body while providing continuous movement between the laser beam and the intermetallic body while firing the laser beam with sufficient power to vaporize the ablative medium with the pulses and forming laser beam spots on the coated surface. The laser may be fired to form a pattern of overlapping laser beam spots while the relative movement is being provided. The intermetallic body may be constructed of a titanium aluminide material suitable for use as a turbine airfoil or, in another embodiment, of a nickel aluminide material suitable for use as a compressor airfoil.

ADVANTAGES

Among the advantages provided by the present invention is the improved ability to use inter-metallic materials in articles that operate in environments that are subject to high tensile and vibratory stress fields and/or which are subject to fatigue failure. The major advantage of using inter-metallic materials is the large weight savings it affords to designs of gas turbine engines and other apparatus. The invention allows the use of these low weight, high strength, and heat resistant materials to be used for gas turbine engines such as for compressor and turbine blades which may be subject to nicks and tears in the leading and trailing edges of the blade and vane airfoils. The present invention provides for an increased life over previously proposed inter-metallic articles and in particular gas turbine airfoil. Another advantage of the present invention is that compressor and turbine blade airfoils can be constructed with commercially acceptable life spans with a reduction in weight of now only the blades themselves but also the weight of the disk or drum rotors that support the blades.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
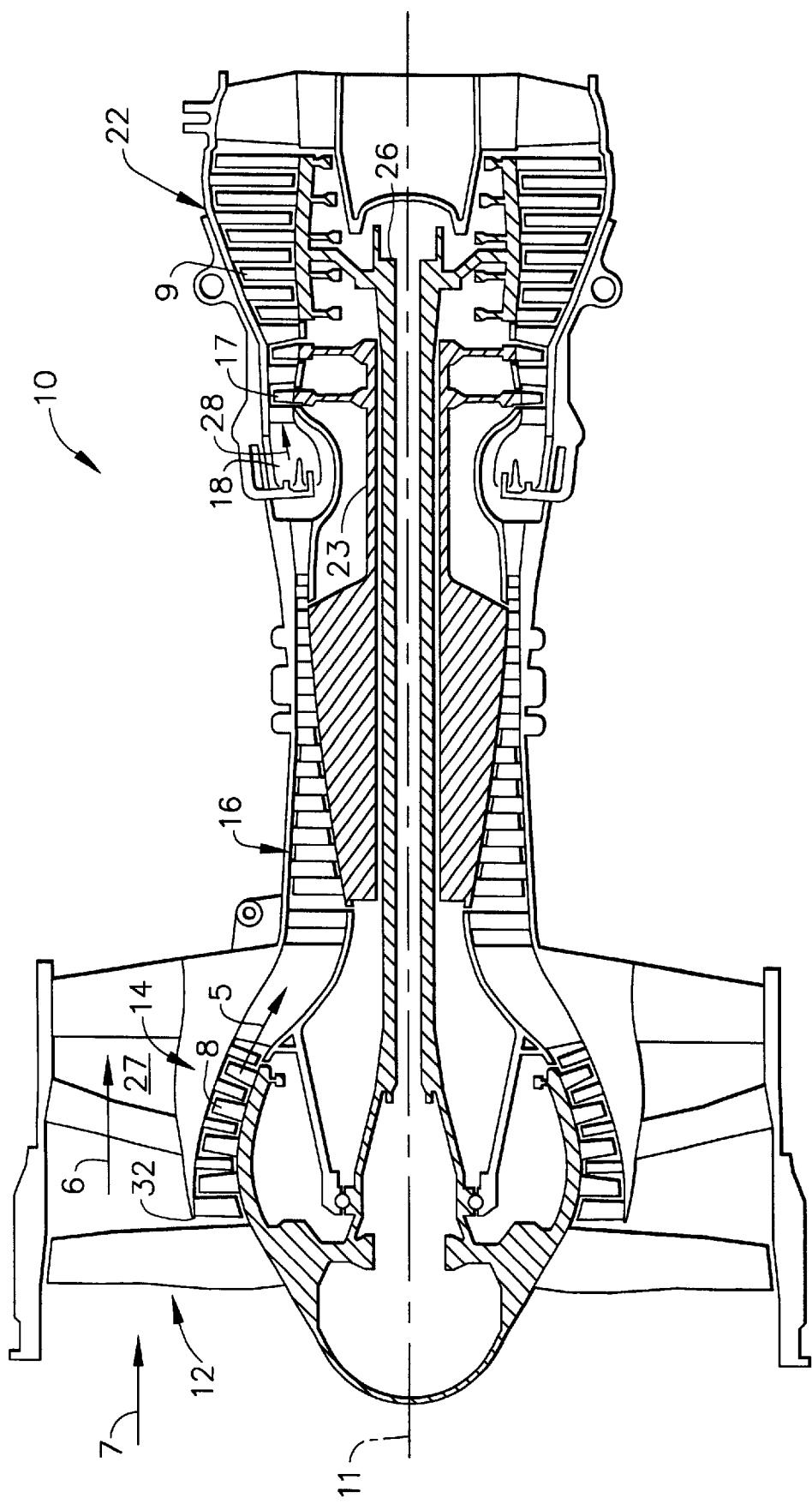
FIG. 1 is a cross-sectional illustrative view of an exemplary aircraft gas turbine engine in accordance with the present invention.

Illustrated in FIG. 1 is a schematic representation of an aircraft gas turbine engine 10 including an exemplary aircraft gas turbine engine component in the form of a compressor blade 8 and a turbine blade 9 in accordance with embodiments of the present invention. The gas turbine engine 10 is circumferentially disposed about an engine centerline 11 and has, in serial flow relationship, a fan section 12, a low pressure compressor 14 containing the compressor blade 8, a high pressure compressor 16, a combustion section 18, a high pressure turbine 17, and a low pressure turbine 22 containing the turbine blade 9. The combustion section 18, high pressure turbine 17, and low pressure turbine 22 are often referred to as the hot section of the engine 10. A high pressure rotor shaft 23 connects, in driving relationship, the high pressure turbine 17 to the high pressure compressor 16 and a low pressure rotor shaft 26 drivingly connects the low pressure turbine 22 to the fan section 12 and the low pressure compressor 14. Fuel is burned in the combustion section 18 producing a very hot gas flow 28 which is directed through the high pressure and low pressure turbines 17 and 22, respectively, to power the engine 10. A bypass portion 6 of engine air 7 passing through the fan section 12 is bypassed around the high pressure compressor 16 and the hot section through a bypass duct 27 having an entrance at a flow splitter 32 between the fan section 12 and the high pressure compressor 16. A core portion 5 of the engine air 7 is directed into the low pressure compressor 14 which is mounted on the low pressure rotor shaft 26 between the splitter 32 and the high pressure compressor 16.

The invention is further illustrated for the low pressure turbine blade 9 in the low pressure turbine 22, however, the invention is designed to be used in a low pressure compressor if so desired as well as other parts of a gas turbine engine such as the compressor blade 8 or other non gas turbine engine articles for which an intermetallic material may be used. Different applications may use different intermetallics. Nickel aluminide intermetallic materials may be better suited for compressor blades and airfoils while Titanium Aluminides may be better suited for turbine blades and airfoils.

Figure 2:
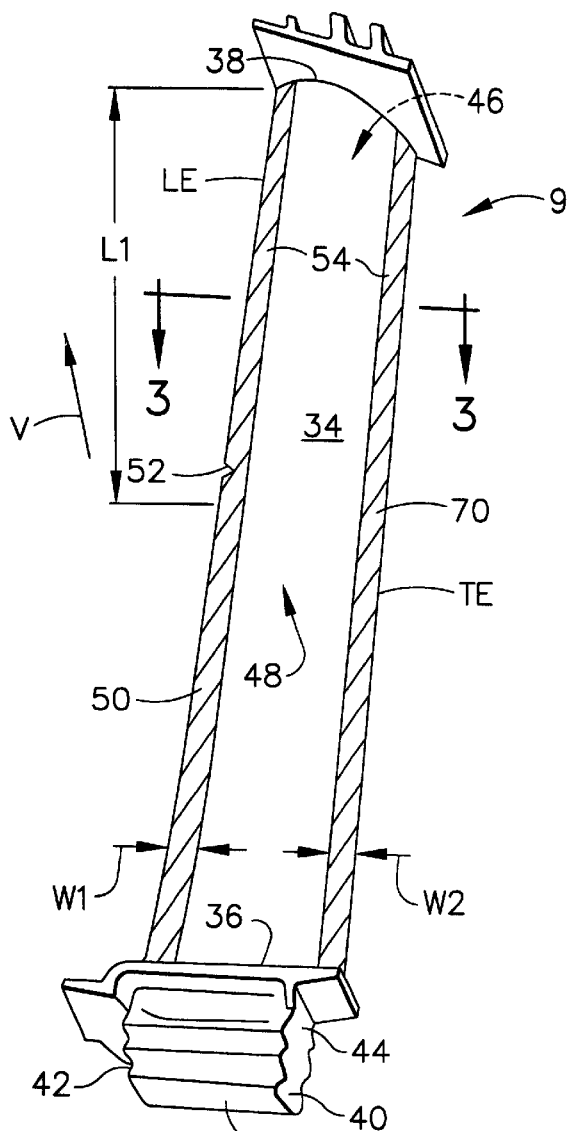
FIG. 2 is a perspective illustrative view of an exemplary aircraft gas turbine engine turbine blade in accordance with the present invention.
Figure 3:
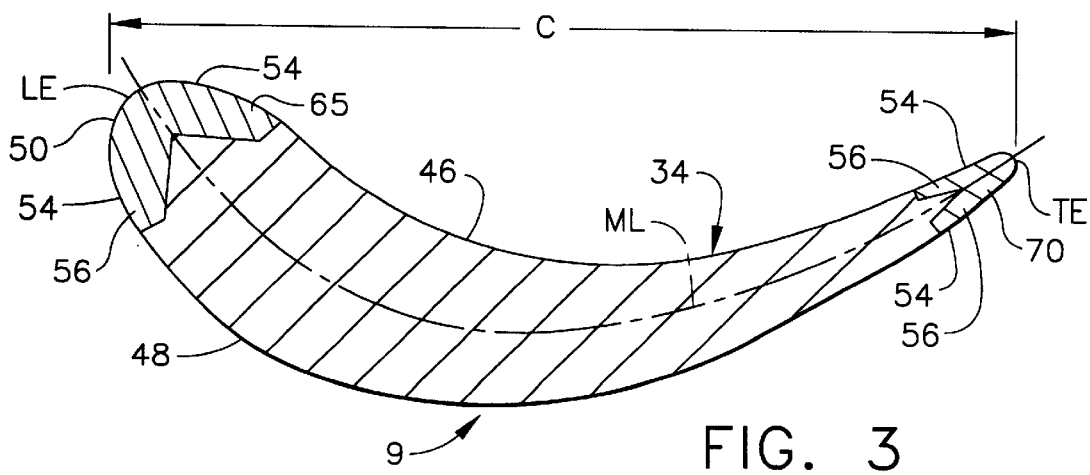
FIG. 3 is a cross-sectional view through the turbine blade taken along line 3—3 as illustrated in FIG. 2.

Referring to FIGS. 2 and 3, the turbine blade 9 includes an intermetallic airfoil 34 extending radially outward from a blade platform 36 to a blade tip 38. The turbine blade 9 includes a root section 40 extending radially inward from the platform 36 to a radially inward. end 37 of the root section 40. At the radially inward end 37 of the root section 40 is a blade root 42 which is connected to the platform 36 by a blade shank 44. A chord C of the airfoil 34 is the line between the leading LE and trailing edge TE at each cross-section of the blade as illustrated in FIG. 3. The airfoil 34 extends in the chordwise direction between a leading edge LE and a trailing edge TE of the airfoil. A pressure side 46 of the airfoil 34 faces in the general direction of rotation as indicated by arrow V and a suction side 48 is on the other side of the airfoil and a mean-line ML is generally disposed midway between the two faces in the chordwise direction.

Referring again to FIG. 2, turbine blade 9 has a leading edge section 50 that extends along the leading edge LE of the airfoil 34 from the blade platform 36 to the blade tip 38. The leading edge section 50 includes a predetermined first width W1 such that the leading edge section 50 encompasses nicks 52 and tears that may occur along the leading edge of the airfoil 34. The airfoil 34 is subject to a significant tensile stress field due to centrifugal forces generated by the turbine blade 9 rotating during engine operation. The airfoil 34 is also subject to vibrations generated during engine operation and the nicks 52 and tears operate as high cycle fatigue stress risers producing additional stress concentrations around them.

To counter fatigue failure of portions of the blade along possible crack lines that can develop and emanate from the nicks and tears at least one and preferably both of the pressure side 46 and the suction side 48 have a laser shock peened surfaces 54 and a pre-stressed region 56 having deep compressive residual stresses imparted by laser shock peening (LSP) extending into the airfoil 34 from the laser shock peened surfaces as seen in FIGS. 2 and 3. Preferably, the pre-stressed regions 56 are co-extensive with the leading edge section 50 in the chordwise direction to the full extent of width W1. The pre-stressed regions 56 are shown co-extensive with the leading edge section 50 in the radial direction along the leading edge LE but may be shorter, extending from the tip 38 along a portion L1 of the way along the leading edge LE towards the platform 36 as more particularly illustrated in FIG. 2. This is particularly useful when damaging nicks 52 tend to occur close to the tip 38. The turbine blade 9 also has a trailing edge section 70 that extends along the trailing edge TE of the airfoil 34 from the blade platform 36 to the blade tip 38. The trailing edge section 70 includes a predetermined second width W2 in which it may also be desirable to form laser shock peened surfaces 54 and pre-stressed regions 56 having deep compressive residual stresses imparted by laser shock peening (LSP) extending into the airfoil 34 from the laser shock peened surfaces as seen in FIG. 2.

Figure 4:
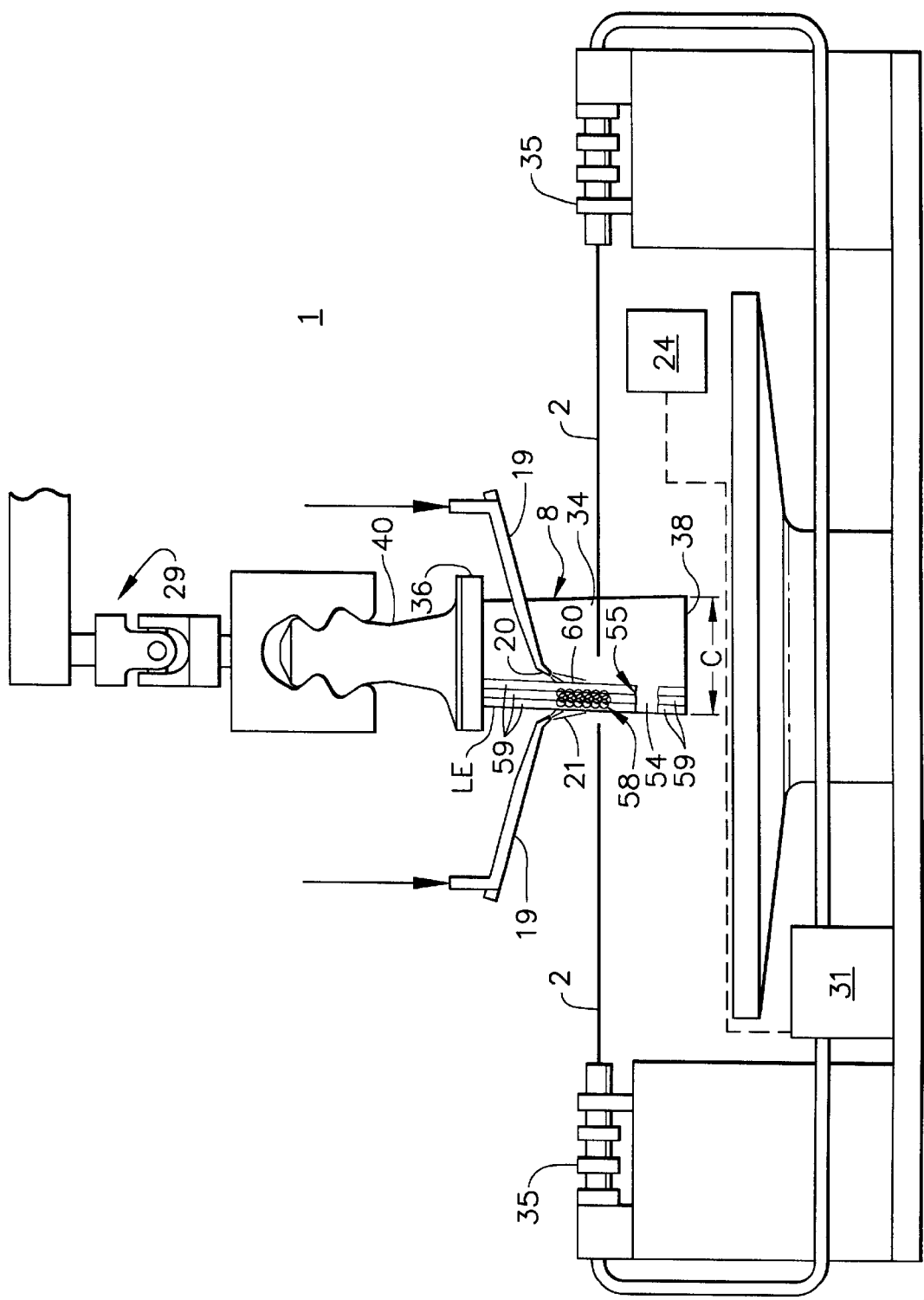
FIG. 4 is a schematical perspective view of the blade of FIG. 1 coated and mounted in a laser shock peening system illustrating the method of the present invention.
Figure 5:
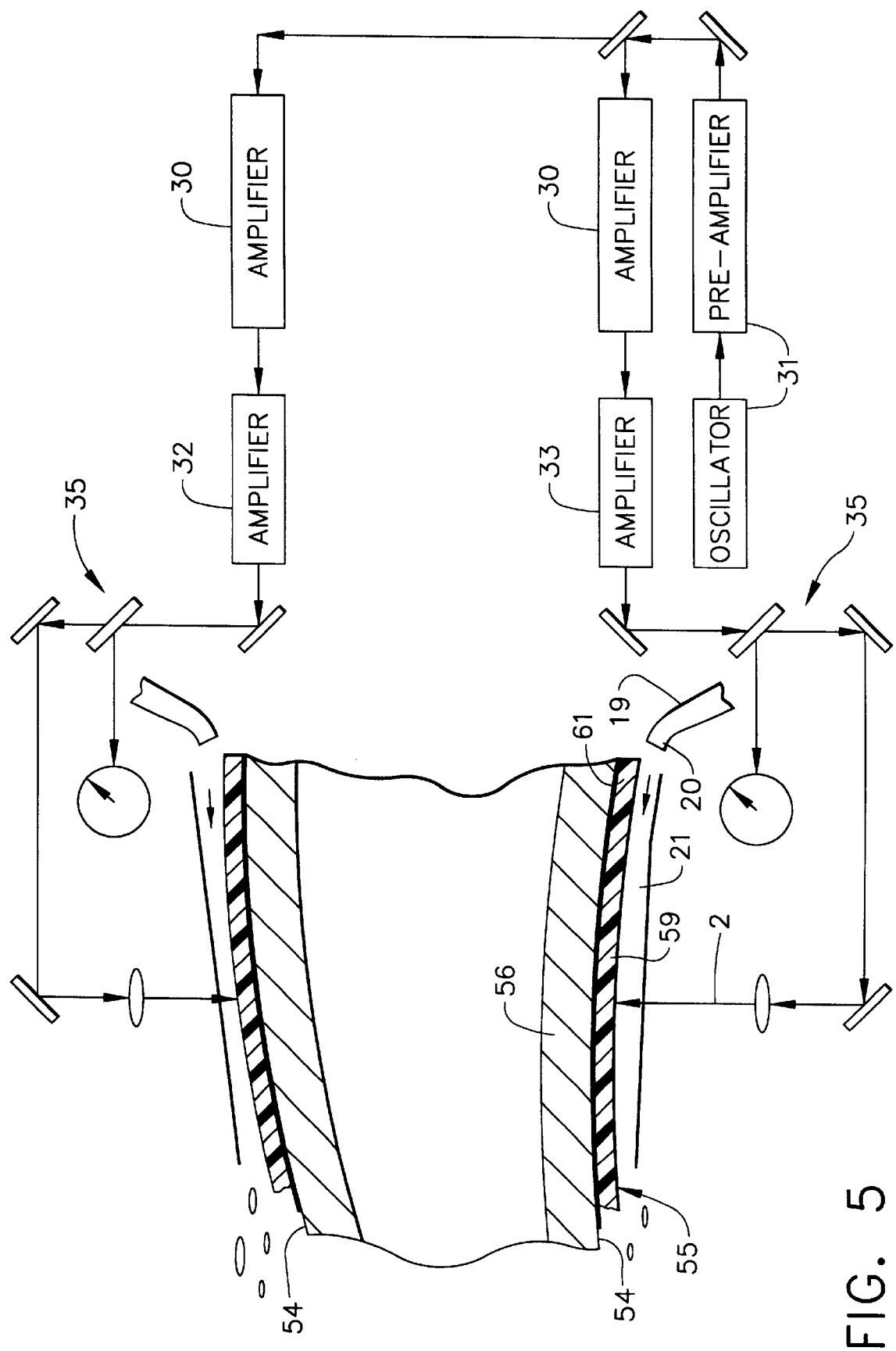
FIG. 5 is a partial cross-sectional and a partial schematic view of the setup in FIG. 4.

Illustrated in FIGS. 4 and 5 is the turbine blade 9 mounted in a robotic arm 29 used to move and position the blade to effect laser shock peening "on the fly" in accordance with a laser shock peening method and apparatus 1 of the present invention. The invention is illustrated for use in laser shock peening the leading edge section 50, in accordance with an embodiment of the present invention, as indicated by a laser shock peened surface 54 which is covered by an ablative coating 59, such as a layer of an adhesive tape or paint, having overlapping laser shock peened circular spots 58. The present invention provides that laser shock peened surfaces 54 be coated with an ablative medium to provide a laser shock peening coated surface 55 suitable for explosive laser shock peening.

A confining means to cover the laser shock peening coated surface 55 is provided by a curtain of clear fluid such as water 21 supplied by a water nozzle 20 at the end of a water supply tube 19. The curtain of water 21 is particular to the exemplary embodiment illustrated herein, however other types of confining means may be used such as a clear coating or layer on an adhesive tape having an ablative medium. The laser shock peening apparatus 1 illustrated herein includes a laser beam apparatus including a generator 31 having an oscillator and a pre-amplifier and a beam splitter which feeds the pre-amplified laser beam into two beam optical transmission circuits each having a first and second amplifier 30 and 33, respectively, and optics 35 which include optical elements that transmit and focus the laser beam 2 on the laser shock peening taped surface 55. The controller 24 may be used to modulate and fire the laser beam apparatus to fire the laser beam 2 on the laser shock peening coated surface 55 in a controlled manner.

Laser beam shock induced compressive residual stresses as used in metallic articles such as titanium and nickel based alloys and super alloys are generally about 50–150 KPSI (Kilo Pounds per Square Inch) in the compressive pre-stressed regions 56 extending from the laser shock peened surfaces 54 up to a depth of about 20–50 mils into laser shock induced compressive residually pre-stressed regions 56. However, because of the brittleness of most intermetallics, the present invention may also be used down to about 2–7 mils and still be very advantageous. The laser beam shock induced deep compressive residual stresses are produced by repetitively firing a high energy laser beam 2 that is defocused ± a few mils with respect to the laser shock peening coated surface 55. The laser beam 2 typically has a peak power density on the order of magnitude of a gigawatt/ $cm^2$ and is fired through the curtain of flowing water 21 that is flowed over the coated surface 55. The ablative coating 59 is explosively ablated generating plasma which results in shock waves on the laser shock peened surfaces 54 of the intermetallic material. These shock waves are redirected towards the laser shock peened surface 54 by the curtain of flowing water to generate travelling shock waves (pressure waves) in the intermetallic material below the coated surface. The amplitude and quantity of these shockwave determine the depth and intensity of compressive stresses. The coating, whether it be tape or paint, is used to protect the target surface and also to provide ablative material to generate the plasma. Ablated paint or tape material is washed out by the curtain of flowing water 21. The depth of compressive residual shock may be limited while still obtaining high levels of compressive residual stresses by limiting the number of repetitive hits on the same spot and the degree of overlap of adjacent spots.

This and other methods for laser shock peening are disclosed in greater detail in U.S. patent Ser. No. 08/319, 346, entitled "LASER SHOCK PEENED ROTOR COMPONENTS FOR TURBOMACHINERY", and in U.S. patent Ser. No. 08/362,362, entitled "ON THE FLY LASER SHOCK PEENING" which are both incorporated herein by reference. The use of tape as a coating is disclosed in U.S. patent Ser. No. 08/638,623, entitled "ADHESIVE TAPE COVERED LASER SHOCK PEENING" and in U.S. patent Ser. No. 08/638,622, entitled "DRY TAPE COVERED LASER SHOCK PEENING".

Laser shock peening on the fly both with and without a painted ablative coating is disclosed in U.S. patent application Ser. No. 08/362,362, and laser shock peening using a tape ablative coating is disclosed with a water curtain in U.S. patent application Ser. No. 08/638,623, and without a water curtain in U.S. patent application Ser. No. 08/638,622.

A sequence of laser firings may be used wherein virgin coating 59 on the surface is ablated each time and to that end the laser shock peened surfaces 54 is coated before each sequence of laser firings and laser shock peening. A clear confining layer may replace the curtain of water 21 flowed over the laser shock peened coated surface 55. A tape without an adhesive layer, may also be used with a suitable adhesive material applied directly to the laser shock peened surface 54. Suggested materials for the ablative confinement layers include plastic, such as vinyl plastic film, wherein the ablative medium may be pigmented black and the confinement layer pigmented clear. The tape should be rubbed or otherwise pressed against the shock peened surface 54 to remove bubbles that may remain between the tape and the laser shock peened surface. Suggested materials for the ablative layer include plastic such as vinyl plastic film. One suitable source for the tape without a clear confining layer is SCOTCH BRAND NO. 471 PLASTIC FILM TAPE which can be had with a black pigmented vinyl plastic backing, about 4 mils thick, and has a rubber adhesive layer, about 1 mil thick.

Figure 6:
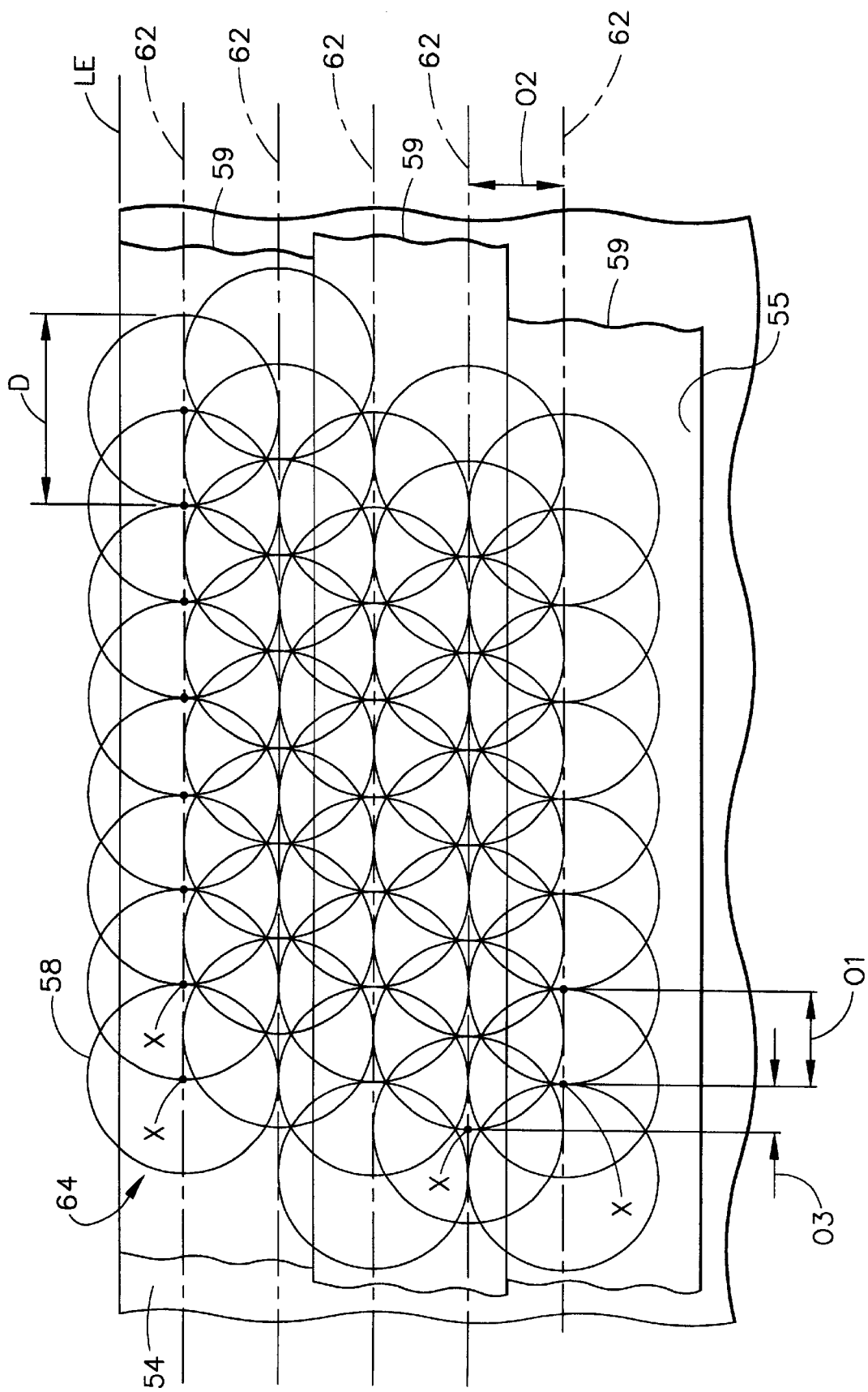
FIG. 6 is a schematic illustration of a pattern of laser shock peened circular spots on a laser shock peened surface along a leading edge of the fan blade in FIG. 4.
Figure 7:
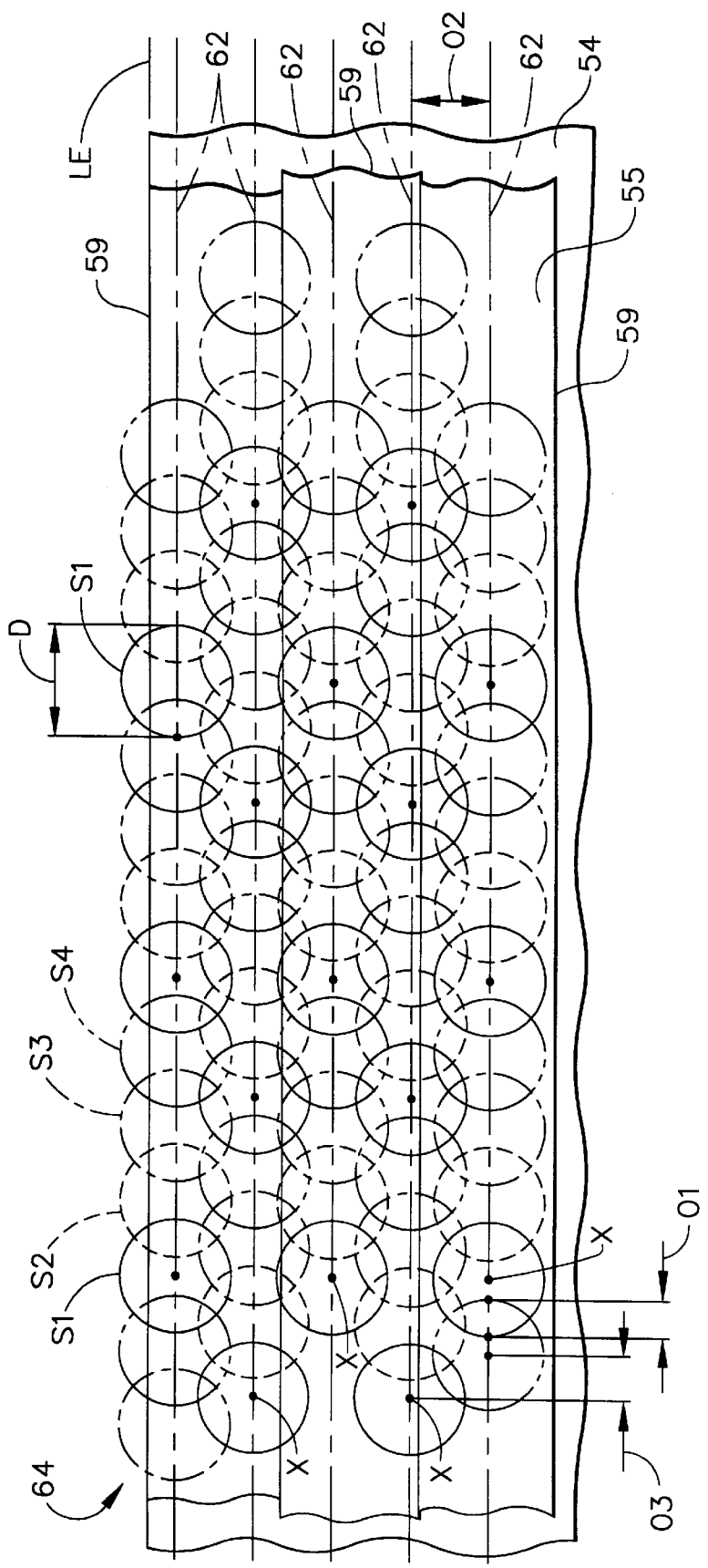
FIG. 7 is a schematic illustration of a particular pattern having four sequences of laser shock peened circular spots that don't overlap within a given sequence.

FIGS. 6 and 7 illustrates patterns of laser shock peened circular spots 58 (indicated by the circles) of four such sequences S1 through S4. The S1 sequence is shown as full line circles, as opposed to dotted line circles of the other sequences, to illustrate the feature of having non adjacent laser shock peened circular spots 58 with their corresponding centers X along a row centerline 62. The pattern of sequences entirely covers the laser shock peening coated surface 55. The laser shock peened circular spots 58 have a diameter D in a row 64 of overlapping laser shock peened circular spots. The pattern may be of multiple overlapping rows 64 of overlapping shock peened circular spots on the laser shock peening coated surface 55. A first overlap is between adjacent laser shock peened circular spots 58 in a given row and is generally defined by a first offset O1 between centers X of the adjacent laser shock peened circular spots 58 and can vary from about 30%–50% or more of the diameter D. A second overlap is between adjacent laser shock peened circular spots 58 in adjacent rows and is generally defined by a second offset O2 between adjacent row centerlines 62 and can vary from about 30%–50% of the diameter D depending on applications and the strength or fluency of the laser beam. A third overlap in the form of a linear offset O3 between centers X of adjacent laser shock peened circular spots 58 in adjacent rows 64 and can vary from about 30%–50% of the diameter D depending on a particular application.

This method is designed so that only virgin or near virgin tape or paint is ablated away without any appreciable effect or damage on the surface of the airfoil. This is to prevent even minor blemishes or remelt due to the laser which might otherwise cause unwanted aerodynamic effects on the blade's operation. Several sequences may be required to cover the entire pattern and re-coating of the laser shock peened surfaces 54 is done between each sequence of laser firings. The laser firing each sequence has multiple laser firings or pulses with a period between firings that is often referred to a "rep". During the rep, the part is moved so that the next pulse occurs at the location of the next laser shock peened circular spot 58. Preferably, the part is moved continuously and timed to be at the appropriate location at the pulse or firing of the laser beam. One or more repeats of each sequence may be used to hit each laser shock peened circular spot 58 more than once. This may also allow for less laser power to be used in each firing or laser pulse.

The process may be used to laser shock peen the coated surface 55 using five rows of laser shock peened spots and covering the entire area of the laser shock peened surfaces 54 in four sequences designated S1, S2, S3 and S4. The laser shock peening process starts with the first sequence where every four spots is laser shock peened on sequence 1 while the blade is continuously moved and the laser beam is continuously fired or pulsed. The part is timed to move between adjacent laser shock peened spots in the given sequence such as S1. The timing coincides with the rep between the pulses of the continuous laser firing on the blade. All five rows of the overlapping laser shock peened circular spots 58 contain spots of each sequence spaced apart a distance so that other laser shock peened circular spots of the same sequence don't effect the coating 59 around it. Sequence 1, preceded by a first taping, is shown by the complete or full circles in the FIG. 4 while the other laser shock peened spots such as in sequence S2, S3 and S4 are illustrated as dotted line, single dashed line, and double dashed line circles, respectively. Before the next sequence, such as between sequence S1 and sequence S2, the entire area of the laser shock peened surface 54 to be laser shock peened is re-coated. This procedure of re-taping avoids any of the bare metal of the laser shock peened surface from being hit directly with the laser beam. For an area coverage of five rows with the spacing between rows and between adjacent spots of about 30%, it is found that one coating, either tape or paint and three re-coatings will be necessary so that the part is actually coated four times in total. It has been found desirable to laser shock peen a given part, such as a disk corner, with between two and five rows. It has also been found desirable to laser shock peen each spot 58 up to 3 or more times. If each spot 58 is hit 3 times then 1 coating and 11 re-coatings is required for three sets of sequences S1–S4 for a total of 12 coatings. Note that the laser shock peened surface 54 my be laser shock peened bare, without any coating, preferably with the use of the water curtain. Bare laser shock peening would eliminate the need for coatings and re-coatings.

Though the exemplary embodiment of the present invention is illustrated for a gas turbine engine rotor component such as a disk and, more particularly a turbine disk suitable for use in a hot section of a gas turbine engine other metallic articles may be fashioned in the same manner.

The present invention has been illustrated in detail in the form of an intermetallic turbine blade but is applicable to other intermetallic turbine rotor components as well as any intermetallic article. While the preferred embodiment of the present invention has been described fully in order to explain its principles, it is understood that various modifications or alterations may be made to the preferred embodiment without departing from the scope of the invention as set forth in the appended claims.

We claim:

1. An article comprising:
   an intermetallic body,
   at least one laser shock peened surface on at least a portion of said intermetallic body,
   a region having compressive residual stresses imparted by laser shock peening extending into said intermetallic body from said laser shock peened surface,
   wherein said article is a gas turbine engine component comprising:
   an intermetallic airfoil having a leading edge and a trailing edge and a pressure side and a suction side,
   at least one laser shock peened surface on at least one of said sides of said airfoil,
   said laser shock peened surface extending radially along at least a portion of said leading edge and extending chordwise from said leading edge, and
   a region having compressive residual stresses imparted by laser shock peening extending into said airfoil from said laser shock peened surface.

2. A component as claimed in claim 1 further comprising:
   a first laser shock peened surface located along said pressure side of said leading edge, a first region having compressive residual stresses imparted by laser shock peening (LSP) extending into said airfoil from said first laser shock peened surface, a second laser shock peened surface located along said suction side of said leading edge, and a second region having compressive residual stresses imparted by laser shock peening (LSP) extending into said airfoil from said second laser shock peened surface.

3. A component as claimed in claim 2 wherein said laser shock peened regions extending into said airfoil from said laser shock peened surfaces are formed by simultaneously laser shock peening both sides of said airfoil.

4. A component as claimed in claim 2 further comprising:

pressure and suction side laser shock peened trailing edge surfaces extending radially at least along a portion of said trailing edge and extending chordwise from said trailing edge on said pressure and suction sides respectively of said airfoil, a pressure side trailing edge laser shock peened region having compressive residual stresses imparted by laser shock peening (LSP) extending into said airfoil from said pressure side laser shock peened surface; and a suction side trailing edge laser shock peened region having compressive residual stresses imparted by laser shock peening extending into said airfoil from said suction side laser shock peened surface.

5. A component as claimed in claim 4 wherein said pressure side and suction side trailing edge laser shock peened regions extending into said airfoil from said laser shock peened surfaces are formed by simultaneously laser shock peening both sides of said trailing edge of said airfoil.

6. A gas turbine engine component as claimed in claim 5 wherein said component is a gas turbine engine turbine blade comprising:

an intermetallic airfoil having a leading edge and a trailing edge and a pressure side and a suction side, at least one laser shock peened surface on at least one side of said airfoil, said laser shock peened surface extending radially along at least a portion of said leading edge and extending chordwise from said leading edge, and a region having compressive residual stresses imparted by laser shock peening extending into said airfoil from said laser shock peened surface.

7. A turbine blade as claimed in claim 6 further comprising:

a first laser shock peened surface located along said pressure side of said leading edge, a first region having compressive residual stresses imparted by laser shock peening extending into said airfoil from said first laser shock peened surface, a second laser shock peened surface located along said suction side of said leading edge, and a second region having compressive residual stresses imparted by laser shock peening extending into said airfoil from said second laser shock peened surface.

8. A gas turbine engine turbine blade as claimed in claim 7 further comprising:

a second pair of laser shock peened surfaces extending radially at least along a portion of said trailing edge located along pressure and suction sides of said trailing edge, and a second pair of regions having compressive residual stresses imparted by laser shock peening extending into said airfoil from said second pair of laser shock peened surfaces.

9. A turbine blade as claimed in claim 8 wherein said laser shock peened regions extending into said airfoil from said laser shock peened surfaces are formed by simultaneously laser shock peening both sides of said leading edge of said airfoil and by simultaneously laser shock peening both sides of said trailing edge of said airfoil.

10. A method for laser shock peening an intermetallic article, said method comprising:

forming an coated surface by covering a laser shock peened surface on at least a portion of an intermetallic body of the intermetallic article with an ablative medium, providing a confining medium over the coated surface, firing a laser beam on the coated surface with sufficient power to vaporize the ablative medium and forming a region in the intermetallic body having compressive residual stresses imparted by the laser beam pulsing such that the region extends into the intermetallic body from the laser shock peened surface, and wherein the step of forming a coated surface comprises adhesively covering the laser shock peened surface with a tape having an ablative medium.

11. A method as claimed in claim 10 further comprising:

continuously firing the laser beam, which repeatably pulses between relatively constant periods, on the coated surface of the body while providing continuous movement between the laser beam and the intermetallic body, firing the laser beam with sufficient power to vaporize the ablative medium with the pulses and forming laser beam spots on the coated surface, and firing the laser to form a pattern of overlapping laser beam spots while the relative movement is being provided.

12. A method for laser shock peening an intermetallic article, said method comprising:

forming an coated surface by covering a laser shock peened surface on at least a portion of an intermetallic body of the intermetallic article with an ablative medium, providing a confining medium over the coated surface, firing a laser beam on the coated surface with sufficient power to vaporize the ablative medium and forming a region in the intermetallic body having compressive residual stresses imparted by the laser beam pulsing such that the region extends into the intermetallic body from the laser shock peened surface, wherein the step of providing a confining medium over the coated surface comprises flowing a fluid curtain over the coated surface, continuously firing the laser beam, which repeatably pulses between relatively constant periods, on the coated surface of the body while providing continuous movement between the laser beam and the intermetallic body, firing the laser beam with sufficient power to vaporize the ablative medium with the pulses and forming laser beam spots on the coated surface, firing the laser to form a pattern of overlapping laser beam spots while the relative movement is being provided, and wherein the intermetallic body is a gas turbine engine airfoil and the portion of the intermetallic body is a leading edge of the airfoil.

13. A method as claimed in claim 12 wherein the material of the intermetallic body comprises a titanium aluminide material suitable for use as a turbine airfoil.

14. A method as claimed in claim 12 wherein the material of the intermetallic body comprises a nickel aluminide material suitable for use as a compressor airfoil.

* * * * *